United States Patent [19]

Teshima et al.

[11] Patent Number: 5,658,660
[45] Date of Patent: Aug. 19, 1997

[54] MAGNETIC CORE COATED WITH TIN FREE ELECTRODEPOSITION COATINGS

[75] Inventors: Hiroyoshi Teshima, Saihaku-gun; Makoto Hasegawa, Yonago; Kazuya Nakamura, Toyonaka; Shigenori Uda, Osaka, all of Japan

[73] Assignee: Matsushita Electric Industrial Co., Ltd., Kadoma, Japan

[21] Appl. No.: 557,949

[22] Filed: Nov. 14, 1995

[30] Foreign Application Priority Data

Nov. 15, 1994 [JP] Japan .................... 6-280551

[51] Int. Cl.⁶ .................................... H01F 3/00
[52] U.S. Cl. ................ 428/334; 428/416; 428/692; 428/900; 336/219; 335/297; 310/45
[58] Field of Search .................. 428/334, 416, 428/692, 900; 336/219; 335/297; 310/45

[56] References Cited

U.S. PATENT DOCUMENTS

| | | | |
|---|---|---|---|
| 4,259,163 | 3/1981 | Suzuki et al. | 204/181 T |
| 5,074,979 | 12/1991 | Valko et al. | 204/181.7 |
| 5,183,836 | 2/1993 | Kishi et al. | 523/404 |
| 5,202,383 | 4/1993 | Moriarity et al. | 525/124 |
| 5,386,008 | 1/1995 | DuBois et al. | 528/87 |
| 5,417,507 | 5/1995 | Uno et al. | 384/107 |
| 5,426,548 | 6/1995 | Fujii et al. | 360/98.08 |
| 5,451,306 | 9/1995 | Nakamura et al. | 204/181.7 |
| 5,472,998 | 12/1995 | Tessmer et al. | 523/404 |

FOREIGN PATENT DOCUMENTS

| | | |
|---|---|---|
| 51-40504 | 4/1976 | Japan . |
| 57-196856 | 12/1982 | Japan . |
| 58-083559 | 5/1983 | Japan . |
| 2-303574 | 12/1990 | Japan . |
| 6-233481 | 8/1994 | Japan . |

*Primary Examiner*—Stevan A. Resan
*Attorney, Agent, or Firm*—Wenderoth, Lind & Ponack

[57] ABSTRACT

In order to prevent clouding of a hard disc and a polygon mirror, a tin-free electrodepositing coating composition is used as an insulating coated film of a motor for driving the hard disc and polygon mirror.

9 Claims, 1 Drawing Sheet

(a)　　　(b)

MAGNETIC CORE COATED WITH TIN FREE ELECTRODEPOSITION COATINGS

BACKGROUND OF THE INVENTION

The present invention relates to a magnetic core of motors, transformers, etc., which are used as peripheral apparatuses for a hard disc, a polygon mirror and the like.

As these apparatuses, used for office automation (referred to as OA hereinafter) apparatuses, have been miniaturized, and a high performance has been achieved more and more, recently, volume reduction and miniaturization of a magnetic core of motors have been sought. A high-insulating coated film which is thin and has no pinhole is required for the surface of a thin magnetic core so as to increase an effective area of winding. In order to obtain excellent output characteristics, an electrodeposition coating has recently exclusively been used in place of a powder coating which has hitherto been used. However, regarding almost all of electrodeposition coating compositions which are put to practical use, polyisocyanates have heretofore exclusively been used as a crosslinking agent. In addition, as a curing agent for efficiently carrying out the crosslinking reaction, organic tin compounds have been used.

On the other hand, as the precision of OA apparatuses is improved, a phenomenon in which clouding, of unknown origin, is formed on the surface of a hard disc (magnetic disc) or a polygon mirror, used for these apparatuses so as to cause a wrong operation or printing failures has become a problem. In the process of examining the cause, it has become apparent that the problem is caused by the fact that organic tin compounds contained in the coating composition to be used for a motor or a transformer, which drives the hard disc or are polygon mirror or provided at the periphery thereof, is activated by chlorine, water, etc. and gasified to be adsorbed on the surface of the hard disc. It has been found that, in case of a motor for driving a hard disc and a motor for a polygon mirror driving an apparatus, the apparatus is in the closed state so that the hard disc or polygon mirror becomes cloudy even if a gas containing a trace amount of tin is vaporized.

SUMMARY OF THE INVENTION

The present invention relates to a magnetic core of motors, transformers, etc., which are used as peripheral apparatuses for a hard disc, a polygon mirror and the like. This magnetic core has a tin-free electrodeposition-coated film as a coated film for rust resistance and insulation, particularly a coated film formed using a cationic epoxy electrodeposition coating composition. Therefore, clouding to be formed on the hard disc or polygon mirror, which has hitherto been a problem, can be prevented, thereby preventing mistakes in operation.

DETAILED DESCRIPTION OF THE INVENTION

An object of a present invention is to provide peripheral apparatuses which do not cause clouding in a hard disc or polygon mirror.

As a magnetic core of motors or transformers, which are used as peripheral apparatuses for OA apparatuses, a magnetic core having an insulating electrodeposition-coated film is formed using a tin-free electrodeposition coating composition.

The magnetic core of the motor for driving the hard disc or the motor for the polygon mirror driving apparatus, i.e. an iron core, is considered to be a serious problem in the present invention. Therefore, the magnetic core for the motor will be explained hereinafter.

Figure 1:
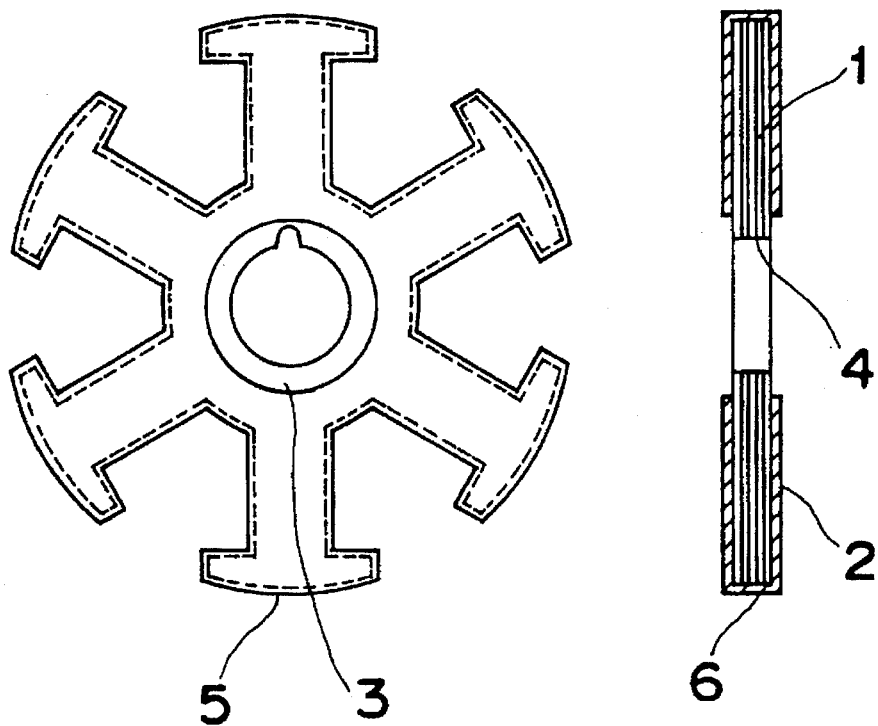
FIG. 1(a) is a top view illustrating an electrodeposition-coated iron core having a masking section of a motor in one embodiment of the present invention.
FIG. 1(b) is a sectional view illustrating the electrodeposition-coated iron core having the masking section of the motor in the first embodiment of the present invention.

One embodiment of a magnetic core for a motor is shown in FIGS. 1(a) and 1(b). In FIGS. 1(a) and 1(b), 1 is an iron core (magnetic core), 2 is an electrodeposition-coated film, 3 is a masking section, 4 is an inner diameter section of the core, 5 is an outer periphery section of the core and 6 is an electrodeposition-coated film of the outer periphery section of the core. FIG. 1(a) is a top view of the magnetic core and FIG. 1(b) is a sectional view of the magnetic core. As shown in FIG. 1(b), the magnetic core may be a multi-layer type.

In the present invention, the surface of the magnetic core is electrodeposited to impart insulating properties.

The coating composition to be used for electrodeposition is not specifically limited, and it may be a cationic or anionic electrodeposition coating composition, preferably a cationic electrodeposition coating composition in view of corrosion resistance. Regarding the cationic electrodeposition coating composition, an ionic group may be a primary, secondary or tertiary amine, or an onium group such as quaternary ammonium group, phosphonium group, sulfonium group and the like.

As the cationic electrodeposition coating composition, an epoxy or acrylic resin coating composition is preferably used. The epoxy resin coating composition is particularly preferred in view of its insulating properties.

Examples of the epoxy resin electrodeposition coating composition include polyglycidyl ethers of polyphenol, which is obtained from polyphenol and epihalohydrin, polyglycidyl ethers of polyhydric alcohol, glycidyl polycarboxylates, epoxides of an ethylenically unsaturated aliphatic or alicyclic compound, polyesters having a hydroxyl group or a carboxyl residue at the terminal end, polyglycidyl compounds of caprolactone and the like.

Examples of the polyphenol to be used for the epoxy resin include bisphenols (e.g. bisphenol A, bisphenol F, etc.), 1,1-bis-(4-hydroxyphenyl)n-heptane, 4,4-dihydroxybenzophenone, bis-(4-hydroxyphenyl)-1,1-ethane, bis-(4-hydroxyphenyl)-1,1-isobutane, bis-(4-hydroxy-tert-butylphenyl)-2,2-propane, bis-(2-hydroxynaphthyl)methane, 1,5-dihydroxynaphthalene, phenolic novolac resin and methylolphenol resin (e.g. resol type phenol resin, etc). In the present invention, particularly preferred phenols are bisphenols.

Epoxides to be used for the epoxy resin may be polyglycidyl ethers of polyhydric alcohols. Examples of the polyhydric alcohols include ethylene glycol, diethylene glycol, triethylene glycol, propylene glycol, dipropylene glycol, 1,5-pentanediol, glycerin, pentaerythritol, trimethylolpropane, bis(4-hydroxycyclohexyl)-2,2'-propane and the like.

Examples of the polycarboxylic acid include oxalic acid, succinic acid, maleic acid, adipic acid, azelaic acid, sebasic acid, terephthalic acid, 2,6-naphthalenedicarboxylic acid, hexahydrophthalic acid, dimer acid and the like.

Examples of the ethylenically unsaturated compound include epoxidated polybutadiene and the like.

These epoxy resins may be their derivatives, which are, for example, chain-extended by suitable chain extenders such as organic phenols.

Polyglycidyl ethers of the polyphenol are preferred, and diglycidyl ethers of bisphenol A and derivatives thereof are particularly preferred.

The epoxy resin suitable for the present invention has a number-average molecular weight of not less than 300, more preferably 500 to 3500, particularly 1000 to 3000. The number of the epoxy groups in one molecule is one or more in average.

Regarding the epoxy compound, at least one part of the epoxy resin is reacted with a primary amine, a secondary amine, a tertiary amine or a salt thereof, alkanolamines (e.g. monoethanolamine, diethanolamine, triethanolamine, monopropanolamine, etc.), alkylalkanolamines (e.g. diethylpropanolamine), ketimines, oximes, various heterocyclic compounds, phosphines, sulfides, and the like to form an amine group or an onium group and to form a cation group in the molecule so that the resin transfers to the cathode by applying a voltage. A particularly preferred cation group is a group formed by the reaction between the secondary amine and epoxy group.

The cation group is neutralized with a low-molecular weight acid so as to make the resin water-soluble or water-dispersible. Examples of the acid include organic acids such as acetic acid, lactic acid, formic acid, propionic acid, lactic acid, and the like; and inorganic acids such as hydrochloric acid, boric acid, etc.

A crosslinking agent is further formulated in the above resins to crosslink the electrodeposition-coated film. Examples of the crosslinking agent include polyisocyanates, aminoplasts and the like. Polyisocyanates are blocked with a suitable blocking agent in use. The blocked polyisocyanates are stable at room temperature, i.e. electrodeposition. After electrodeposition, the block is removed by heating the electrodeposition-coated film in the baking step and the isocyanate group is dissociated. Then, the isocyanate group is reacted with a group having an active hydrogen atom, which is present in the resin molecule, particularly hydroxyl groups or a precursor thereof to form crosslinked resin-coated film.

Examples of the polyisocyanate include aromatic polyisocyanates and aliphatic polyisocyanates. Examples of the aromatic polyisocyanates include 1,3-phenylene diisocyanate, 1,4-phenylene diisocyanate, 2,4-tolylene diisocyanate, 2,6-tolylene diisocyanate, 4,4'-diphenylene diisocyanate, 1,5-naphthalene diisocyanate, 1,4-naphthalene diisocyanate, 1-isocyanatomethyl-5-isocyanate-1,3,3 trimethylcyclohexane, bis(4-isocyanatocyclohexyl) methane, bis(4-isocyanatophenyl)methane, 4,4'-diisocyanatodiphenyl ether, 2,3-bis(8-isocyanatooctyl)-4-octyl-5 hexylcyclohexene and the like.

Examples of the aliphatic polyisocyanate include trimethylene diisocyanate, tetramethylene diisocyanate, pentamethylene diisocyanate, hexamethylene diisocyanate, propylene diisocyanate, ethylmethylene diisocyanate, 2,6-dimethylethylene diisocyanate, 1-methyltrimethylene diisocyanate, 1,3-cyclopentylene diisocyanate, 1,4-cyclohexylene diisocyanate, 1,2-cyclohexylene diisocyanate and the like.

A polyisocyante having an isocyanate functional group more than the above can also be used. Examples thereof include tris(4-isocyanatophenyl)methane, 1,3,5-triisocyanatobenzene, 2,4,6-triisocyanatotoluene, 1,3,5-tris(6-isocyanatohexyl)biuret, (2,5-diisocyanato-4-methylphenyl)methane and polyisocyanate polymers, e.g. dimer and trimer of tolylpolyisocyanate. Furthermore, a mixture of polyisocyanates, polyether polyols or polyester polyols may be used.

As the blocking agent, there can be used aliphatic, alicyclic, aroaliphatic alcohols or phenols can be used. Examples thereof include aliphatic alcohols having 1 to 12 carbon atoms, preferably having 1 to 8 carbon atoms which may have a branch; alicyclic alcohol such as cyclohexanol, cyclopentanol, etc.; aroaliphatic alcohol such as benzyl alcohol and the like; and phenols such as phenol, methylphenol and the like. In addition, oximes such as methyl ethyl ketoxime, and amines such as dimethylamine, dimethylethanolamine and the like may be used.

The blocked polyisocyanate may be a half blocked polyisocyanate. The half blocked polyisocyanate means those in which a part of isocyanate groups of the polyisocyante are reacted with a group having an active hydrogen atom of the resin, e.g. a hydroxyl group, and the residual isocyanate groups are blocked with the above blocking agent. When using an amine compound as the blocking agent, the amine compound acts as a catalyst and the crosslinking reaction can be accelerated in the absence of a tin catalyst.

Examples of the aminoplast crosslinking agent include hexamethyl ether of hexamethylolmelamine, triethyl trimethyl ether of hexamethylolmelamine, hexabutyl ether of hexamethylolmelamine, hexamethyl ether of hexamethylolmelamine and butyrated melamineformaldehyde resin of the polymer. Similarly, an alkylated urea-formaldehyde resin can be used.

In the present invention, a tin catalyst is not used even if a blocked polyisocyanate is used as the crosslinking agent. The catalyst may not be used, but the baking temperature is raised or a polyisocyanate reactable at a comparatively low temperature is used as the crosslinking agent in that case. As the catalyst in place of tin, for example, there can be used iron compounds such as ferric chloride, ferric 2-ethyl hexoate and the like; titanium compounds such as tetra(2-ethylhexyl)titanate and the like; cobalt compounds such as cobalt 2-ethyl hexoate, cobalt naphthenate and the like; metal compounds such as zinc naphthenate, copper naphthenate, antimony trichloride and the like; amines, for example, monoamines such as triethylamine, dimethylcyclohexylamine; diamines such as tetramethylenediamine, tetramethylpropane-1,3-diamine; tetramethylhexanetriamines, pentamethyldiethylenetriamine, pentamethyldipropylenetriamine; tetramethylguanidine; cyclic amines such as triethylenediamine, dimethylpiperazine, methyl(2 dimethylamino)-ethylpiperazine, N-methylmorpholine, (dimethylaminoethyl)-morpholine, 1,2-dimethylimidazole; alcoholamines such as dimethylamino ethanol, dimethylamino ethoxyethanol, trimethylaminoethyl-ethanolamine, N-methyl-N'-(2 hydroxyethyl)-piperazine, N-(2-hydroxyethyl)morpholine; etheramines such as bis(2-dimethylaminoethyl) ether, ethylene glycol bis(3-dimethyl) -aminopropyl ether.

The electrodeposition coating composition to be used in the present invention may further contain other resins, viscosity modifiers, fluidity modifiers, surfactants, antioxidants, defoamers, pigments, solvents and the like.

Examples of the other resins include monofunctional cationic resins which are reactive with a polyisocyanate for adjusting the hardness of the cured coated film, a pigment grinding resin for uniformly dispersing pigments, etc.

The solvent adjusts solubility of the cation electrodeposition resin or acts as a coated film forming auxiliary.

Examples of the suitable solvent include hydrophilic solvents such as isopropanol, butanol, ketones, alkylene glycols and alkyl ether of alkylene glycols (e.g. ethylene glycol butyl ether, etc.).

Examples of the viscosity modifier include thixotropic agents and the like and they may be selected appropriately from those which have hitherto been used for a conventional electrodeposition coating composition.

It is particularly preferred that the fluidity modifiers are used in combination with the electrodeposition coating composition for the magnetic core of the present invention.

A sharp burr along the punching direction is formed on the cut surface of the magnetic core and, therefore, the electrodeposition-coated film is thin at the section due to the surface tension and shrinkage stress at curing. Otherwise, the core is exposed and the film of the winding is scratched at this section at the time of winding thereby causing a short between the winding and the core. Accordingly, this phenomenon must be prevented. The fluidity modifier is added to prevent a thinning phenomenon of the film at the burr section. As the fluidity modifier, solid or semi-solid fine particles are used. Examples of the fine particles include inorganic pigments and organic resin fine particles, but organic gel fine particles, particularly particles which contain a cation group and transfer to the magnetic core surface at the cathode together with the electrodeposition coating composition are preferred. In addition, they may have a group which is reactive with an isocyanate group.

Examples of the particularly preferred fluidity modifier in the present invention include gel fine particles obtained by emulsion polymerization, e.g. copolymers containing monomers which have a polymerizable ethylenically unsaturated group such as methylol phenols, polybutadienes having an amino group, styrene, acryl, methacryl and the like. Examples of the typical gel fine particles suitable for the present invention include cationic gel fine particles obtained by the reaction between methylol phenols and amine addition polybutadiene. The molecular weight (number-average molecular weight) of the former is 200 to 1000 and that of the latter is 1000 to 3000. As the resol type phenol resin, Taconol 720721 (manufactured by Arakawa Kagaku Kogyo K.K.) and WP551, WP201 (manufactured by Gunei Kagaku Kogyo K.K.) are commercially available.

The amine addition polybutadiene resin can be produced by epoxidizing a polybutadiene resin (number-average molecular weight:1000 to 3000, 1,2-bond: 30 to 100%) using peracetic acid and adding an amine. As such a resin, for example, there can be used C-1800-6,5 manufactured by Nihon Sekiyu Kagaku K.K.

When the amount of the methylolphenol is less than 20 parts by weight, based on 100 parts by weight of the total amount of the gel fine particle-dispersed solution (on the basis of the solid content conversion), the coated film is not sufficiently cured. On the other hand, when the amount exceeds 50 parts by weight, the corrosion resistance is lowered. Therefore, the suitable amount is 20 to 50 parts by weight.

When the amount of the amine addition polybutadiene resin is less than 50 parts by weight, based on 100 parts by weight of the total amount of the gel fine particle-dispersed solution (on the basis of the solid content conversion), the stability of the gel particles is deteriorated due to lack of water-solubility. On the other hand, when the amount exceeds 80 parts by weight, the edge covering properties are deteriorated due to lack of gelation in the interior of the particles. Therefore, the suitable amount is 50 to 80 parts by weight.

The gel fine particle-dispersed solution is obtained as an emulsion by adding glacial acetic acid to a predetermined amount of the above methylolphenol compound and amine addition polybutadiene resin, sufficiently stirring the mixture, adding deionized water and then emulsifying the solution.

The pigment paste to be used for the electrodeposition coating composition of the present invention is composed of a pigment grinding resin and a pigment. The pigment grinding resin acts to cover pigment particles to form cationic pigment particles. Preferred examples thereof include quaternary ammonium resin and the like.

As the pigment, coloring pigments, rust resisting pigments, extenders and the like, which have a particle size of not more than 20 μm, can normally be used, appropriately.

As the coloring pigments, for example, there are carbon black, titanium dioxide and the like. Examples of the rust resisting pigments include strontium chromate, basic lead silicate and the like. Examples of the extenders include aluminum silicate, calcium carbonate and the like.

It is preferred to contain the extenders in the amount of 10 to 80 parts by weight, based on 100 parts by weight of the total amount of pigment components. When the amount is less than 10 parts by weight, no edge covering effect is obtained. On the other hand, when the amount exceeds 80 parts by weight, smoothness of the coated surface is deteriorated drastically. Among them, aluminum silicate having a flat particle shape is effective for improving the edge covering rate because the viscosity at the time of baking of the coated film is controlled.

The pigment paste is prepared by adding deionized water to the above pigment grinding resin and pigment, mixing in a dispensor for about one hour, adding glass beads to this mixture and then grinding it in a particle size of not more than 20 μm using a sand mill.

The pigment is used in the amount of 50 to 70 parts by weight, on the basis of the solid content conversion. When the amount is too small, the film hardness becomes insufficient. On the other hand, when the amount is too large, brittlement of the coated film becomes a problem.

The pigment grinding resin is used in the amount of 5 to 15 parts by weight. When the amount is smaller than 5 parts by weight, the pigment is not coated uniformly with the resin. On the other hand, even if not less than 15 parts by weight of the pigment grinding resin is added, the effect of addition can not be obtained and economical disadvantage becomes large.

The coating composition to be used for electrodepositing coating of the present invention is prepared by mixing the above emulsion, pigment paste and gel fine particle-dispersed solution, together with deionized water. The mixing method may be any method capable of mixing each solution uniformly, and is not specifically limited. In case of mixing, the above emulsion, pigment paste and gel fine particle-dispersed solution are corrected, and then deionized water is added with stirring slowly so as not to cause foaming to prepare a coating composition.

It is preferred that the electrodepositing coating composition of the present invention contains 60 to 80 parts by weight of a cation resin component and 20 to 40 parts by weight of blocked isocyanate, based on 100 parts by weight of the total emulsion resin components (on the basis of the solid content conversion). It is preferred that the fluidity modifier is formulated in the amount of 18 to 72 parts by weight, based on 100 parts by weight of the emulsion resin (on the basis of the solid content conversion). By increasing the melting viscosity at the time of baking using this formulation, flow of the coating composition at the edge section is inhibited, thereby drastically improving the edge covering properties. When 30 to 60 parts by weight of the gel fine particle-dispersed solution is formulated, the effect is particularly large. When the amount of the gel fine particle-dispersed solution is smaller than 18 parts by weight, the edge covering properties are deteriorated remarkably. On the other hand, when the amount of the gel fine particle-dispersed solution is larger than 72 parts by weight, the smoothness of the coated surface deteriorates drastically, thereby constituting a hindrance to winding a wire.

When using the pigment, the pigment is previously dispersed in a pigment grinding resin to prepare a pigment paste. The amount of the pigment in the pigment paste and pigment grinding resin is 50 to 70 parts by weight and 5 to 15 parts by weight, respectively, on the basis of the solid content conversion. The amount of the pigment paste is 50 to 90 parts by weight, based on 100 parts by weight of the resin for forming a coated film (on the basis of the solid content conversion).

When the proportion of the pigment paste is too large, the coated film becomes brittle and an Erichsen value becomes small and, further, voids are liable to be increased.

The cation electrodeposition coating method is not specifically limited, and a known method can be applied using the coating composition obtained above. The specific conditions of the electrodeposition coating should be appropriately set according to the kind, shape and size of electronic parts as the product to be coated, the kind of the coating composition, and the like.

Next, the electrodeposition-coated film is baked after drying. The drying is effective for removing a solvent, hydrogen gas and water, which are present in the electrodeposition-coated film, to prevent voids or pinholes from forming on the coated film at the time of baking. The drying is carried out by standing the electrodeposition-coated film before curing due to baking under a temperature within a range of room temperature to the boiling point of water. When the time for standing under the above temperature is too short, the hydrogen gas, solvent and water, which are present in the coated film before curing due to baking, are not sufficiently removed and voids or pinholes are liable to form on the coated film in the baking step after drying. On the other hand, the time is too long, the drying effect becomes higher, but it is not preferred in view of production. Accordingly, the drying time should be set appropriately so as not to cause the above problem. A sufficient time is normally about 1 to 3 minutes.

The baking is carried out after drying. In the case of baking, the temperature is raised from the final temperature after drying to a predetermined baking temperature. The time for raising the temperature is not more than 10 minutes, preferably about 5 minutes.

On reaching the predetermined baking temperature, baking of the emulsion resin has been completed after standing at the temperature for a given period. The baking condition varies depending on the kind of the coating composition. In the present invention, a tin catalyst is not used and, therefore, it is necessary to carry out the baking at a comparatively high temperature for a long time in comparison with a condition of normal electrodeposition coating. The baking is carried out normally at 160° to 220° C., preferably 170° to 220° C., for about 20 to 25 minutes. The film after electrodeposition coating itself is comparatively hard, and is not deformed even if it is touched slightly with the fingers. This film is further cured by baking to form a harder film. Thereby, the adhesive force with the electronic part substrate is further enhanced. When the baking is carried out under conditions which are gentler than the above conditions, the coated film can not be sufficiently cured. On the other hand, when the condition is too severe, the brittlement of the coated film becomes a problem.

In addition, an ultraviolet curing type tin-free electrodeposition coating, wherein a coated film is cured in a short time by irradiating it with ultraviolet light, may be carried out.

In the present invention, it is preferred that the coated film after electrodeposition coating has an average film thickness of 20 to 100 µm, particularly 30 to 60 µm. When using the fluidity modifier, thinning of the film at the burr section and a short between the metal section and the winding, which is caused by the thinning, can be prevented.

According to the present invention, it is possible to reduce a film thickness of an insulating material to be provided between the winding of an electronic part and the metal section while maintaining the dielectric strength performances. Thereby, an increase in the effective area of the winding as well as a reduction in of weight, volume, length and size can be realized.

When the thickness of the coated film is larger than 100 µm, there is a problem in that a drastic decrease in the effective area of the winding has arisen. On the other hand, when it is smaller than 20 µm, a short between the metal section and the winding section can not be prevented effectively. In the present invention, the thickness of the coated film is an average of the thickness at the flat section, and a thickness of a film at the edge section is not taken into consideration.

Figure 2:
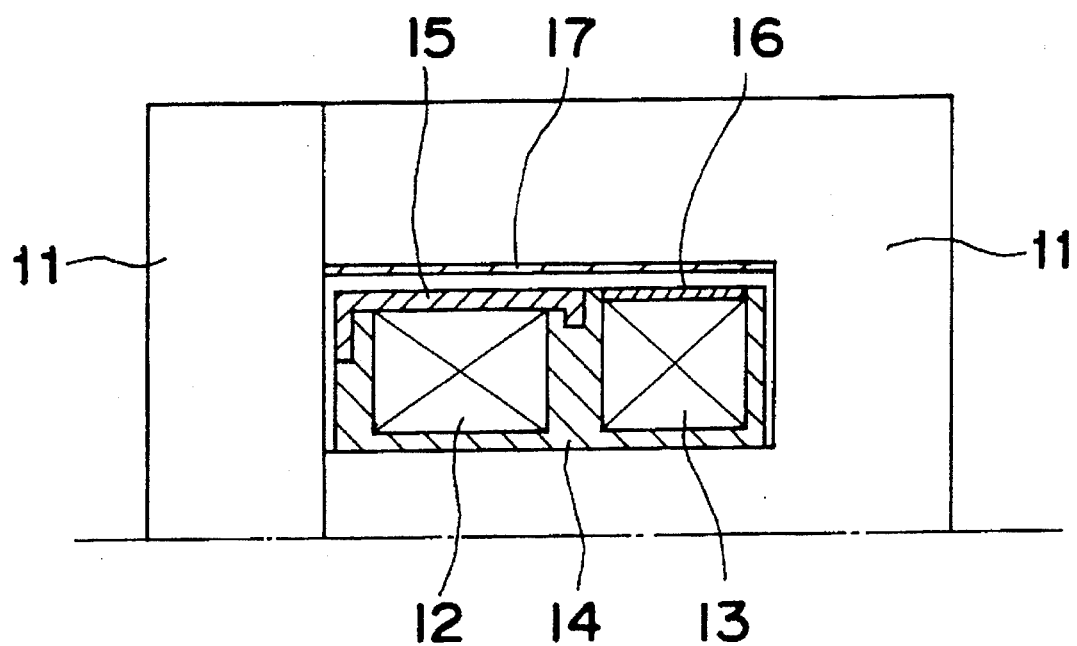
FIG. 2 is a sectional view illustrating a magnetic core of a transformer.

In addition, the present invention can be applied to a transformer as an electronic part for voltage transformation. Heretofore, a transformer has secured insulation between a winding 12, 13 and a core 11 as shown in FIG. 2. That is, a punching burr formed on the core 11 is completely coated with a insulating tape 17 or a bobbin 14 obtained by molding a thermoplastic resin such as PET, PBT, nylon and the like or a thermosetting resin such as phenol, and the outer periphery thereof is coated with an insulating case 15 and an insulating tape 16. If the process of forming a coated film of the present invention is applied to such a transformer, it is possible to reduce the thickness of insulating material (film thickness of bobbin according to a conventional insulating treatment is not less than 1 mm) to be provided between the primary winding 12, secondary winding 13 and core 11. Regarding the transformer, similar to the rotor core for motor, a reduction of weight, volume, length and size, as well as power-up of the voltage transformation capacity, can be realized.

[EXAMPLE]

The following Examples further illustrate the present invention in detail.

A pigment paste, an emulsion and a gel fine particle-dispersed solution, which are contained in the electrodeposition coating composition of the present invention, were prepared as follows.

| (Production of pigment paste) | |
|---|---|
| | parts by weight |
| Quaternary ammonium resin varnish | 192 |
| Carbon black | 9 |
| Titanium dioxide | 318 |
| Basic lead silicate | 27 |
| Kaolin | 101 |
| Deionized water | 318 |

According to the above formulation, deionized water was added to a quaternary ammonium resin varnish to dissolve it. Then, a pigment was added and the mixture was stirred for one hour in a disperser. Glass beads were added to this mixture and, after grinding to a particle size of not more than 15 μm using a sand mill, glass beads were filtered off.

(Resin emulsion)

(1) Production of aminated epoxy resin

1000 Parts by weight of diglycidyl ether (epoxy equivalent) of bisphenol A was dissolved in 463 parts by weight of diethylene glycol monoethyl ether while maintaining at 70° C. with stirring. Furthermore, 80.3 parts by weight of diethylamine were added and the mixture was reacted at 100° C. for 2 hours to obtain an aqueous aminated epoxy resin.

(2) Production of blocked isocyanate crosslinking agent

87 Parts by weight of methyl ethyl ketone oxime was added dropwise to 174 parts by weight of toluene diisocyanate [mixture of 2,4-toluene diisocyanate and 2,6-toluene diisocyanate (=80:20), TDI], slowly, while maintaining the reaction temperature at 50° C. or less by exterior cooling to obtain half blocked isocyanate.

Then, 45 parts by weight of trimethylolpropane was added and the mixture was reacted at 120° C. for 90 minutes. The resulting product was diluted with 131 parts by weight of ethylene glycol monoethyl ether to obtain an aqueous blocked isocyanate.

220 Parts by weight of the above aminated epoxy resin and 146 parts by weight of the blocked isocyanate were neutralized with 4.8 parts by weight of glacial acetic acid, and then diluted with 342 parts by weight of deionized water to obtain an emulsion having a nonvolatile content of about 36%.

(Gel fine particle-dispersed solution)

(1) Production of amine addition polybutadiene

Polybutadiene (B-2000, number-average molecular weight: 2000, 1,2-bond: 65%, manufactured by Nisseki Co., Ltd.) was epoxidated using glacial acetic acid to obtain an epoxidated polybutadiene having an oxirane oxygen content of 6.4%.

After this epoxidated polybutadine (1000 g) and ethyl cellosolve (354 g) were charged in an autoclave, dimethylamine (62.1 g) was added and the mixture was reacted at 150° C. for 5 hours. The unreacted amine was distilled off to produce an amine addition polybutadiene resin solution.

The amine value of the resulting amine addition polybutadiene resin solution was 120 mmol/100 g (solid content). The nonvolatile content was 75%.

| (2) Production of gel fine particle-dispersed solution | |
|---|---|
| | parts by weight |
| Amine addition polybutadiene resin | 100 |
| | (solid content: 75%) |
| Tamanol 722 (*1) | 33.3 |
| | (solid content: 25%) |
| Glacial acetic acid | 2.8 |
| Deionized water | 363.9 |

*1: Resol type phenol resin, manufactured by Arakawa Kagaku Kogyo K.K.

33.3 Parts by weight of Tamanol 722 and then 2.8 parts by weight of glacial acetic acid were added to 100 parts by weight of the amine addition polybutadiene resin obtained above, followed by stirring sufficiently. 363.9 Parts by weight of deionized water was added to emulsify the resulting mixture.

When a part of the resulting emulsified solution was taken and added to a 100-fold amount of tetrahydrofuran, it was dissolved to obtain a transparent solution.

After ethyl cellosolve contained in the amine addition polybutadiene resin was removed, the emulsified solution was maintained at 95° C. for 6 hours and then cooled to obtain a cationic gel fine particle-dispersed solution.

This cationic gel fine particle-dispersed solution was not dissolved in tetrahydrofuran and the resulting solution became cloudy, not transparent. Then, a tinned sheet-iron plate was dipped in a gel fine particle-dispersed solution having a nonvolatile content of 10%, air-dried at room temperature, dried under vacuum and observed using an electron microscope. As a result, fine particles having a particle size of not more than 100 nm were observed.

Preparation of electrodeposition coating composition

The following components were mixed with stirring to prepare an electrodepositing coating composition.

| | parts by weight |
|---|---|
| Pigment paste | 112 |
| | (solid content: 61.6 parts by weight) |
| Resin emulsion | 278 |
| | (solid content: 100 parts by weight) |
| Gel fine particle-dispersed solution | 75 |
| | (solid content: 18 parts by weight) |
| Deionized water | 433 |
| | (solid content: — parts by weight) |

D.C. voltage was applied on a multi-layer type core (inner diameter section is not masked) of a motor for polygon mirror driving device [the number of samples (N) =20] as the cathode and the above coating composition was electrodeposited.

After the electrodeposition, hydro-extraction/drying was carried out by heating from room temperature to 100° C. over about 2 minutes, followed by heating from 100° to 185° C. over about 5 minutes in a hydro-extraction/drying furnace. Furthermore, baking was carried out at 185° C. for 25 minutes in a baking furnace.

The electrodeposition-coated film thus formed completely covered a burr and had the following characteristics.

Average film thickness: 50 μm

% Edge covering: not less than 70%

In the above embodiment, the inner diameter section is not masked, but this section may be masked to provide a non-electrodeposited section. This non-deposited inner diameter section can be used as the reference position for mounting motor parts.

The core obtained above was incorporated into the motor, and insulating properties between the winding and core as well as reflectance of the polygon mirror after running at 60° C. for 1000 hours were measured. When the polygon mirror becomes cloudy, the reflectance is lowered. Therefore, the reflectance becomes an index showing a degree of clouding of the polygon mirror. In addition, the reflectance was defined as a proportion of a detection otained by irradiating laser beam ($\lambda$=780 nm) to a sensor at an incidence angle of 30° in the case of detection obtained by directly irradiating the above laser beam to the sensor being 100%. The minimum value during one revolution of the polygon mirror was taken as the data.

The results are shown in Table 1. Furthermore, according to the same manner as that described in Example 1, except for adding 1 part by weight of dibutyltin oxide to the pigment paste and adding 0.05 parts by weight of dibutyltin dilaurate to the resin emulsion, an electrodeposition coating composition was prepared. Then, according to the same manner as that described in Example 1, except for setting a heating time from a drying temperature of 100° C. to a baking temperature of 160° C. at about 5 minutes, and setting the baking temperature of 160° C. and a baking time of 25 minutes, respectively, the electrodeposition coating composition was used to prepare an electrodeposition-coated core as a Comparative Example.

TABLE 1

|  | Average dielectric strength (V) | | Average reflectance (%) | |
| --- | --- | --- | --- | --- |
|  | Before test | After test | Before test | After test |
| Example | 900 | 900 | 84.9 | 84.8 |
| Comparative Example | 900 | 900 | 84.1 | 79.8 |

(N = 20)

As is apparent from Table 1, according to the present invention, clouding of the polygon mirror can be reduced while maintaining a requisite dielectric strength.

It becomes possible to reduce the volume of the motor by forming an insulating film between a core and a coil using the electrodeposition-coated film of the present invention formed on the core surface and then winding the coil. Therefore, insulating treatment which is superior in mass production can be carried out economically.

In addition, it is necessary to set the baking temperature at a high temperature because of the tin-free coating composition. However, it is the motor wherein a multi-layer core is subjected to an electrodeposition coating using a tin-free coating composition so that a tin-containing gas is not generated even if a device such as a magnetic disc driving motor or a motor for a polygon mirror driving device is in the closed state. Accordingly, a magnetic disc or a polygon mirror is not clouded without the adsorption of the gas thereon.

When the core of the motor coated with the tin-free coating composition is baked, a tin-containing gas is not generated because tin is not contained in the coated film and the surface of the magnetic disc or polygon mirror is not clouded.

We claim:

1. A magnetic core coated with a film of a cationic electrodeposition coating composition comprising cationic-electrodepositable resins and blocked isocyanates without tin.

2. The magnetic core of claim 1, wherein said cationic electrodeposition coating composition is coated on an iron core of a motor.

3. The magnetic core of claim 1, wherein said cationic electrodeposition coating composition comprises a cationic epoxy electrodeposition coating composition.

4. The magnetic core of claim 3, wherein said cationic epoxy electrodeposition coating composition contains a cationic polymer obtained from a reaction product of polyglycidyl ether of a polyphenol having an average molecular weight of 300 to 3500 or a derivative thereof and a secondary amine, and a blocked isocyanate.

5. The magnetic core of claim 1, wherein said cationic electrodeposition coating composition is coated on a multi-layer core.

6. The magnetic core of claim 1, wherein said film of a cationic electrodeposition coating composition has a thickness of 20 to 100 micrometers.

7. A spindle motor of a hard disc drive comprising the magnetic core of claim 1.

8. A motor of a polygon mirror driving device comprising the magnetic core of claim 1.

9. A transformer comprising the magnetic core of claim 1.

* * * * *